March 14, 1939.　　R. L. GEDDES ET AL　　2,150,498

BUBBLE TOWER CONSTRUCTION

Filed Feb. 15, 1935

INVENTORS
Ray Llewelyn Geddes
Ernest W. Thiele
BY
ATTORNEY

Patented Mar. 14, 1939

2,150,498

UNITED STATES PATENT OFFICE 2,150,498

BUBBLE TOWER CONSTRUCTION

Ray Llewelyn Geddes, Hammond, Ind., and Ernest W. Thiele, Chicago, Ill., assignors to Standard Oil Company, Chicago, Ill., a corporation of Indiana Application February 15, 1935, Serial No. 6,620

5 Claims. (Cl. 261—114)

This invention relates to improvements in bubble tower construction and more particularly to bubble towers for use in the fractionation of vapors resulting from the cracking of hydrocarbon oil under heat and pressure.

An object of our invention is to provide an improved bubble tower wherein all of the liquid is forced to flow through restricted zones through which the vapors must pass in ascending from one level of the tower to another.

Another object is to provide a bubble tower wherein the vapors are caused to pass through the liquid twice during their ascent from one chamber of the tower to another, thus to attain higher efficiency in vapor liquid contact.

A further object is to provide a bubble tower wherein bodies of liquid are maintained in each stage which are substantially in equilibrium with vapors directly above, whereby the lighter fractions in said bodies may have an opportunity to be released in vapor form thereby to provide a process in which withdrawal of liquid from each stage may approximate the point at which the heavier fractions collect so that in effect the heavier fractions may comprise the major portion of the liquid descending in the tower.

A further object is to provide structural features as herein described which may be incorporated in bubble towers designed for counter-current or concurrent flow of vapors and liquid.

Other objects and advantages and uses of the invention will be apparent after reading the following specification and claims and after consideration of the drawing forming a part of the specification, wherein:

Figure 1:
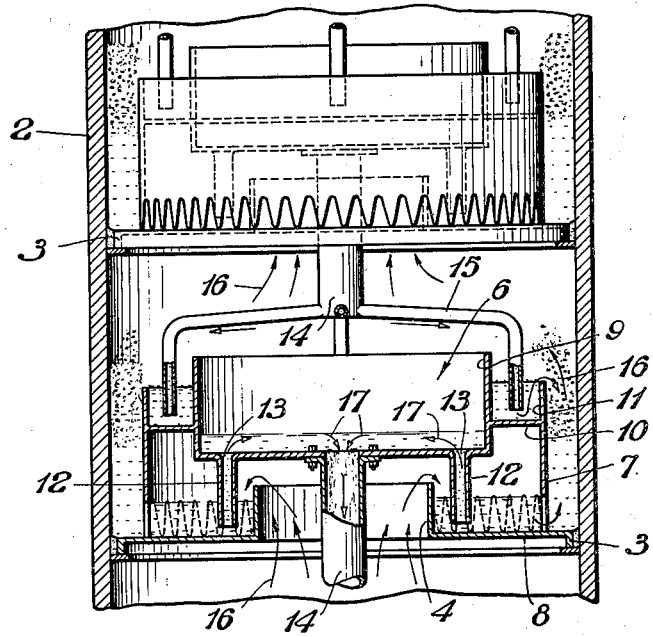
Fig. 1 is a vertical sectional view of a bubble tower constructed in accordance with the invention.
Figure 2:
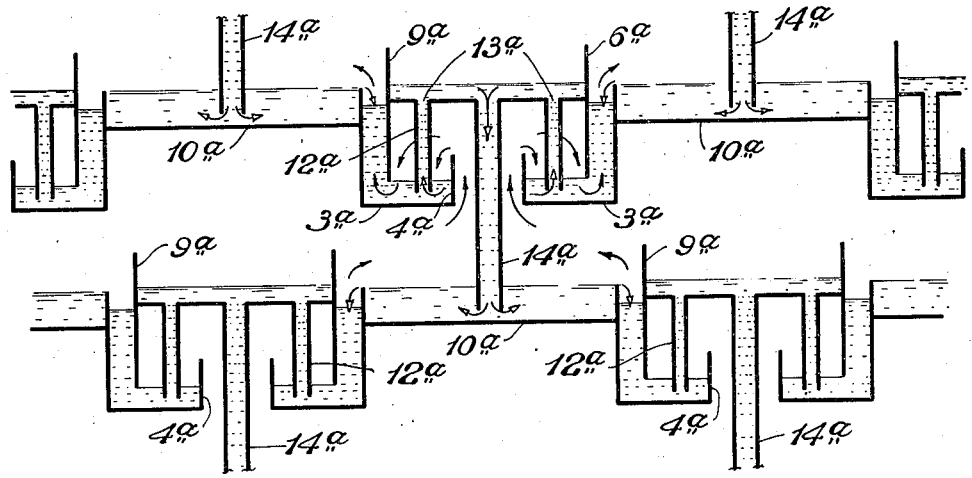
Fig. 2 is a fragmentary sectional view of a modified arrangement of the structure illustrated in Fig. 1.

In Figures 1 and 2, we have illustrated sections of bubble towers of the counter-current type which incorporate structural advantages conducive to more intimate and positive contact between vapors and liquid.

With reference to Fig. 1, we have illustrated therein a section of a bubble tower comprising a shell 2 having a plurality of horizontal tray units disposed in vertical alignment therein. Each of the tray units may comprise a lower tray 3 extending horizontally across the shell and having an annular vapor riser 4 formed centrally thereon, and an upper tray assembly 6.

The upper tray assembly 6 includes an upright annular baffle 7 notched at its lower end as indicated at 8 and adapted to rest directly upon the tray 3. An open liquid receiver 9 is located within the confines of the baffle 7 and fixed thereto through the medium of a flat annular partition wall 10 located at a slight distance below the upper end of the baffle 7 thus to form an annular trough 11 between the inner wall of the baffle 7 and the outer wall of the receiver 9 into which liquid from an upper tray section is first delivered. Liquid so delivered to the annular trough will overflow the wall of the baffle 7 into the annular space between the baffle wall and the shell 2. It is desirable that the side walls of the receiver 9 extend upwardly above the level of liquid in the trough 11 a distance sufficient to preclude the splashing of the liquid thereinto. A plurality of liquid risers 12, four being shown in the apparatus illustrated in Fig. 1, communicate at their upper ends 13 with the receiver 9 and extend downwardly to a point slightly above the surface of the tray 3. The risers may be formed integrally or may be otherwise secured to the receiver 9. A downcomer 14 is secured to the receiver 9 and extends downwardly from the central portion thereof to a point immediately above the receiver 9 of the next lower tray assembly where it may branch into a plurality of radially extending portions 15 all terminating in the annular trough 11, below the level of the liquid in the trough. The receiver 9 being open at the top, as shown, functions to prevent clogging of the tower by liquid filling up the restricted zone, since this liquid may overflow the dam formed by the wall of the receiver 9.

We have indicated by means of arrows 16 and 17 the course of travel of liquid and vapors respectively through the tray units. For purposes of clarity, the arrows 16, indicating vapor flow, have solid heads, whereas the arrows 17, indicating liquid flow, have heads of triangular outline. These two forms of arrows for indicating vapor and liquid, respectively, are employed in all of the figures of the drawing.

In operation, liquid from an upper tray section passses downwardly from the receiver 9, through the downcomer 14 and its several radial branches 15 and into the annular trough 11 of the tray assembly 6. Inasmuch as the lower end of the downcomer tubes are submerged in the liquid, entrance of vapors into the downcomer is precluded. From the trough 11 the liquid overflows the upper wall of the baffle 7 to fall upon the tray 3, a portion passing under the toothed or notched portions 8 of the baffle 7 to occupy the space between the riser 4 and the inner wall of the baffle. Inasmuch as the pressure of the vapors in that area within the baffle 7 below the receiver 9 is greater than that above the immediate upper tray assembly, the level of liquid between the baffle 7 and the tray wall 4 will be relatively high and this differential in pressure will cause liquid, subsequent to its passage under the notched portion of the baffle, to be elevated through the risers 12 into the receiver 9 where it may pass through the downcomer 14 to the next lower tray section.

The vapors within the interior region of the baffle 7 likewise may pass through the notches 8 at the bottom of baffle 7, in a direction opposite to the flow of the liquid therethrough, and upwardly through the relatively restricted annular zone between the baffle and shell wall through which the liquid is forced to travel.

We have thus provided for positive and unusually intimate contact between the liquid and vapors in a zone of such restricted width and appreciable depth that thorough vapor-liquid contact is caused to take place. It will also be apparent that no liquid may pass from the tray section to the next lower section in the manner described before it has been subjected to contact with the vapors and that by-passing of the liquid about the vapors or vice versa is entirely precluded. The liquid while present in the receiver 9 during that interval between its passage from the outlet 13 of the risers 12 to the mouth of the downcomer 14 subsequent to vapor contact therewith may be said to be in a relatively quiescent state and subjected to the relatively lesser vapor pressure of the area above the tray section. This condition encourages the release of lighter vapor fractions which may have become absorbed in the liquid so that in effect the liquid passing from one tray section to an adjacent lower tray section may properly be said to represent only the heavier fractions.

In Fig. 2 we have illustrated a modified arrangement of structure of Fig. 1, such as might be desirable in a tower of relatively large diameter. In Fig. 2 the trays 3 and the tray assembly 6 are arranged in checkerboard style in alternate array. The structural counterparts of the apparatus in Fig. 1 are indicated by the reference numerals of Fig. 1 with the suffix a. The operation of a bubble tower incorporating this modification of tray arrangement is precisely the same as that described in Fig. 1.

It will be noted that in all of the structures thus far described that all of the liquid is forced to flow through restricted zones through which the vapors must flow in the course of their travel from a lower to an upper chamber of the tower. In the apparatus of our invention it is particularly difficult for the vapors to pass through the restricted zone without causing turbulence and hence the so-called stream flow of vapors in one portion and liquid in another portion of the zone is precluded.

In operation, only that liquid with which the vapors have had intimate and positive contact is free to descend from one tray to the adjacent lower tray, contact between vapors and liquid taking place during concurrent flow and in confined spaces. The liquid upon the roofs of the bubble caps and within the downcomer is maintained at the pressure of the adjacent upper chamber and during the course of its travel prior to passage through the spouts may release the higher vapor fractions so as to encourage flow of liquid in a downward direction through the tower that is representative of the lower fractions.

While we have presented herein certain embodiments of our invention by description and illustration of the detailed structure thereof, it is to be understood that such disclosure is for the purpose of illustration only and that the scope of our invention is to be limited only by the appended claims.

We claim:

1. In a fractionating column having superimposed contacting units, said units containing means for contacting downflowing reflux liquid with upflowing vapors wherein said vapors are forced to bubble through a pool of said liquid, the improvement comprising a restricted vertical passage through which said vapors are forced to pass after bubbling through said pool, means for continuously introducing reflux liquid into the upper part of said restricted passage, means for withdrawing reflux liquid from the lower part of said restricted passage, a conduit in each unit for discharging said withdrawn liquid to a unit below said contacting means, and a pool having an overflow dam positioned above said restricted passage and communicating with said discharging conduit from the unit next above whereby reflux liquid may escape from said restricted passage under conditions of excessive vapor velocity.

2. The fractionating apparatus described in claim 1 wherein the upper end of said reflux liquid discharging conduit terminates at a level intermediate the surface of said pool and the upper end of said restricted passage, and a second conduit extends from said pool to said intermediate level whereby liquid is conducted upwardly from said pool to said discharge conduit under the hydrostatic pressure provided by reflux liquid in said restricted passage.

3. In a fractionating column, means for contacting downflowing reflux liquid with up-flowing vapors, including a plurality of bubble tray assembling, one of said bubble tray assemblies comprising a reservoir for maintaining a pool of said reflux liquid, baffle means effective to cause substantially all of said vapors to bubble through said pool in contact with said reflux liquid, means directing substantially all of said downflowing reflux liquid past the point where the vapors bubble through said pool, a uniform restricted passage through which said vapor is forced to pass after leaving said baffle means, means for continuously introducing all of said reflux liquid into said restricted passage and said reservoir, and overflow means for conducting reflux liquid to the next lower bubble tray assembly, a conduit leading from a point near the bottom of said reservoir to a point above the level of the depending edge of said baffle and communicating with said overflow means, whereby reflux liquid may flow from said pool impelled by the head of liquid in said restricted passage.

4. The improvement in fractionating apparatus described in claim 3 wherein means are provided for causing reflux liquid and vapor to flow countercurrently in said restricted passage.

5. In a fractionating apparatus wherein a downflowing stream of reflux liquid is contacted with an upflowing stream of vapors in a plurality of superimposed stages, the improvement comprising in one stage a bubble cap, a reservoir surrounding said bubble cap, means for introducing rising vapors beneath said bubble cap, means for maintaining a pool of said reflux liquid at a level above the downwardly depending edges of the cap, a uniform restricted channel surrounding said bubble cap providing intimate contact between said vapors and said liquid, means for introducing downflowing liquid into said channel and overflow means for conducting said liquid to a lower stage of said fractionating apparatus, said overflow means being positioned relative to the submerged edge of said bubble cap to require all said downflowing liquid to pass said submerged edge of said bubble cap, and auxiliary overflow means between said channel and first overflow means to prevent flooding of said fractionating apparatus under conditions of abnormally high vapor velocities.

RAY LLEWELYN GEDDES.
ERNEST W. THIELE.